United States Patent [19]

Carbon

[11] Patent Number: 4,531,048
[45] Date of Patent: Jul. 23, 1985

[54] CONFECTIONERY GRILL HAVING ADJUSTABLE HEATING ELEMENTS

[75] Inventor: Fred S. Carbon, Buchanan, Mich.

[73] Assignee: F. S. Carbon Company, Buchanan, Mich.

[21] Appl. No.: 617,102

[22] Filed: Jun. 4, 1984

[51] Int. Cl.³ .............................................. H05B 3/06
[52] U.S. Cl. ..................................... 219/525; 16/235; 99/332; 99/376; 99/380; 99/389
[58] Field of Search ............... 219/225, 524, 525, 536, 219/537; 99/331, 332, 372, 374, 376, 378, 379, 380, 389, 390, 391, 392, 425; 16/235; 403/84

[56] References Cited

U.S. PATENT DOCUMENTS

| | | | |
|---|---|---|---|
| 1,498,654 | 6/1924 | Hauptman | 219/525 |
| 2,478,529 | 8/1949 | Farr et al. | 219/524 |
| 2,765,727 | 10/1956 | Lipsich et al. | 219/525 X |
| 3,236,998 | 2/1966 | Wertheimer et al. | 219/524 |
| 3,245,337 | 4/1966 | White et al. | 99/331 |
| 3,377,942 | 4/1968 | Carbon | 99/376 |
| 3,848,110 | 11/1974 | Giguere et al. | 219/525 |
| 3,852,569 | 12/1974 | Potvin | 219/525 |
| 3,938,431 | 2/1976 | Potvin | 99/425 |
| 4,027,139 | 5/1977 | Theimer | 219/525 |
| 4,206,345 | 6/1980 | Maass et al. | 219/524 |

Primary Examiner—Volodymyr Y. Mayewsky
Attorney, Agent, or Firm—James D. Hall

[57] ABSTRACT

A confectionery grill having upper and lower hinged heating elements in which the upper heating element or grill unit can be adjustably spaced at its hinge from the lower heating element or grill unit during the cooking cycle.

2 Claims, 5 Drawing Figures

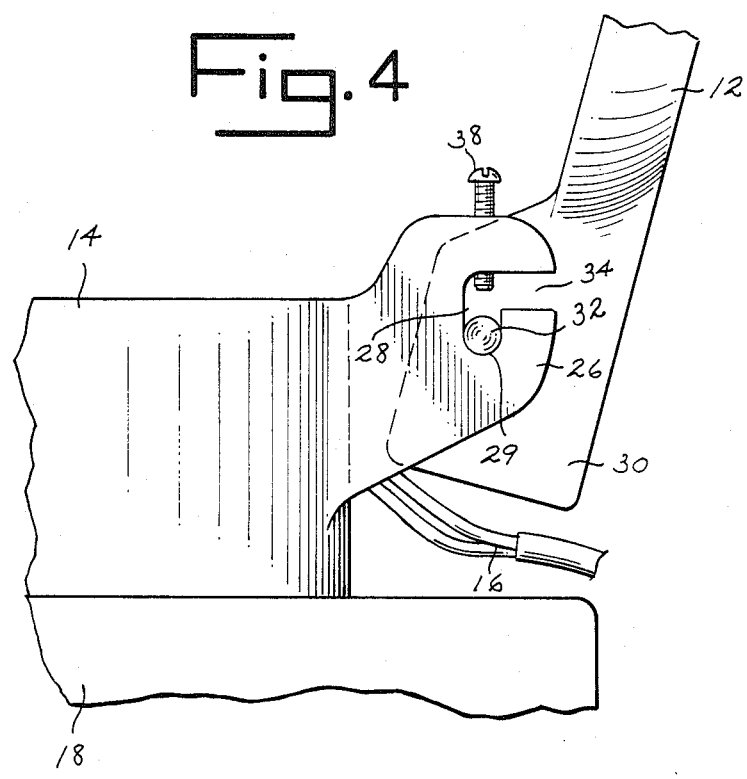
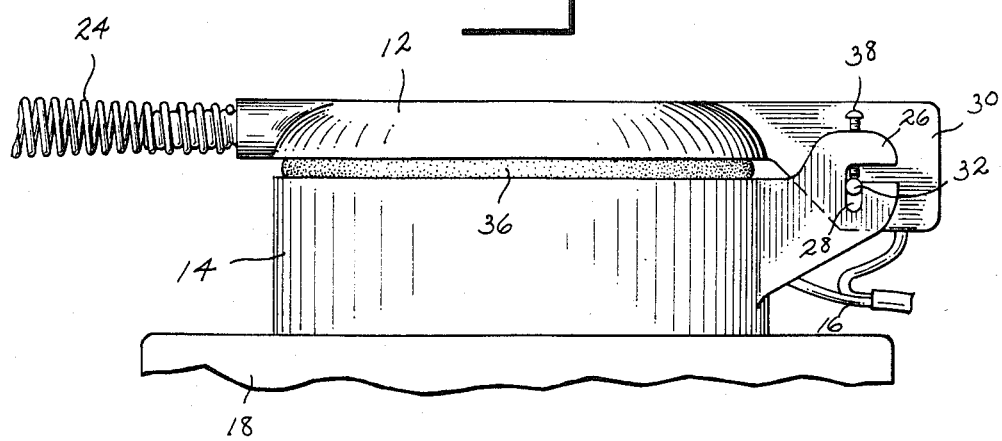

4,531,048

CONFECTIONERY GRILL HAVING ADJUSTABLE HEATING ELEMENTS

SUMMARY OF THE INVENTION

This invention relates to confectionery grills having upper and lower hinged heating elements in which the upper heating element or grill unit can be adjustably spaced at its hinge from the lower heating element or grill unit.

In the grill of this invention, the lower heated grill unit is fixed in position, such as being mounted upon a base, and is connected by a hinge to the upper heated grill unit. The upper heated grill unit is pivoted about the hinge between a closed position overlying the lower grill unit and an open tilted raised position displaced from the lower grill unit. With the upper grill unit in its open position, the lower grill unit is exposed to permit batter to be applied for the subsequent baking cycle. The improvement of this invention relates to the hinged mechanism, which includes a pin and slot relationship, between the upper and lower grill units which permits the upper grill unit to shift generally horizontally upwardly relative to the lower grill unit as the cooking of the batter proceeds due to expansion of the batter. An adjustment device is provided to limit the amount of horizontal travel of the upper grill unit relative to the lower unit so as to regulate the thickness of the cooked item. In this manner, ice cream cones, pancakes and waffles can be cooked with their thickness being regulated through the adjustability of the hinged mechanism of the grill.

Accordingly, it is an object of this invention to provide a confectionery grill having upper and lower heated grill units with the upper unit being raisable in its generally horizontal orientation relative to the lower grill unit during the cooking cycle.

It is another object of this invention to provide a grill which is for confectionery items, such as pancakes, waffles, and ice cream cones, and which includes features to allow the thickness of the cooked confectionery item to be varied.

Other objections of this invention will become apparent upon a reading of the following description.

BRIEF DESCRIPTION OF THE DRAWINGS

A preferred embodiment of this invention has been chosen for purposes of illustration and description wherein:

FIG. 4 is a fragmentary elevational view of the hinge meahanism between the upper and lower grill units with the upper grill unit in an open position.

FIG. 5 is a fragmentary elevational view showing the upper grill unit in its closed position over the lower grill unit and raised to its upper adjusted limit by expansion of the batter between the grill units.

DESCRIPTION OF THE PREFERRED EMBODIMENT

Figure 1:
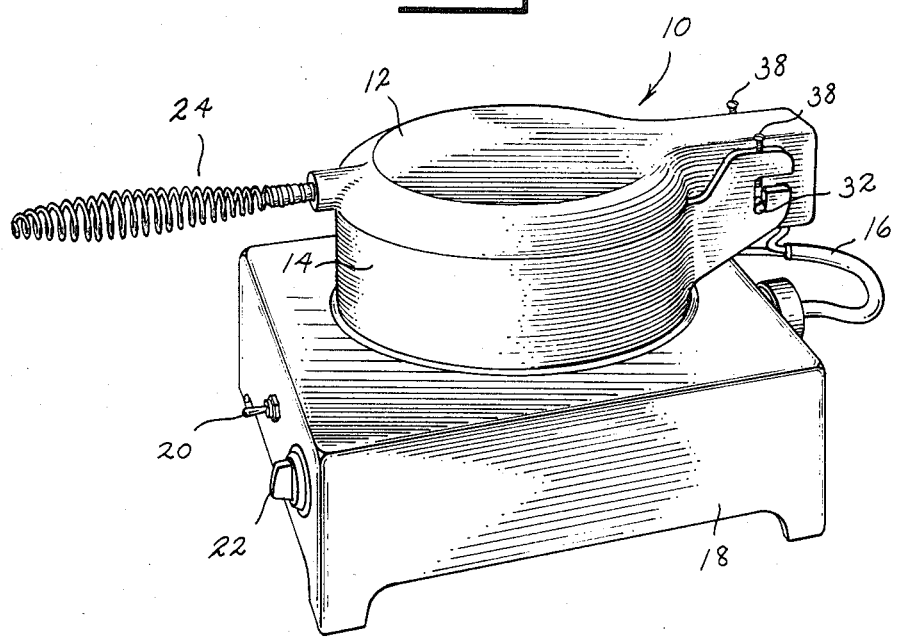
FIG. 1 is a perspective view of the grill shown with the upper grill unit seated in its lowermost closed position over the lower grill unit.
Figure 2:
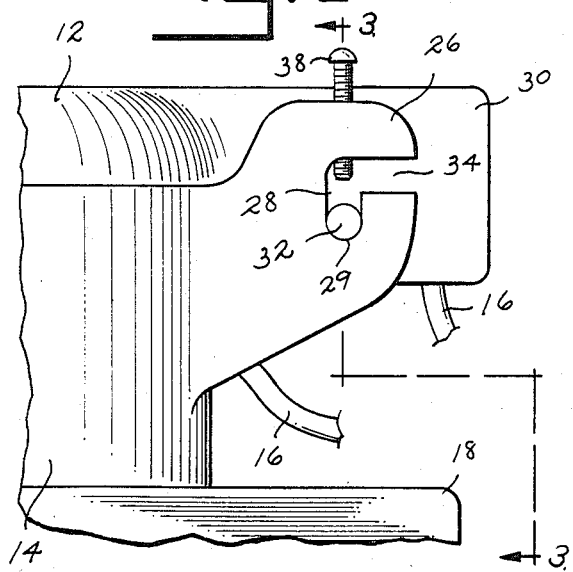
FIG. 2 is a fragmentary elevational view showing the hinged mechanism between the upper and lower grill units.

The preferred embodiment illustrated is not intended to be exhaustive or to limit the invention to the precise form disclosed. It is chosen and described in order to best explain the invention and its application and practical use to enable others skilled in the art to best utilize the invention.

Grill 10 includes a movable upper heated grill unit 12 and a fixed lower heated grill unit 14. Each of the grill units 12, 14 includes electrical heating coils (not shown) which are in turn connected to wiring 16 adapted to be connected to an electrical power source. Lower grill unit 14 is mounted upon a base 18. An on/off power switch 20 and a power timer 22 are utilized to control the power input for the electrical heating coils within grill units 12, 14. Switch 20 is utilized to turn the electric power on and off while timer 22 is utilized to regulate the cooking time of the grill. Upper grill unit 12 is pivotally mounted to lower grill unit 14 to allow the upper grill unit to be pivoted from the closed position shown in FIG. 1 to a tilted open position which allows batter to be applied over the lower grill unit and the cooked confectionery item to be removed after the cooking cycle is completed. Thus far described, grill 10 is of common, commercial construction. The handle 24 is carried by upper grill unit 12 to facilitate its movement between its closed and open positions relative to lower grill unit 14.

Figure 3:
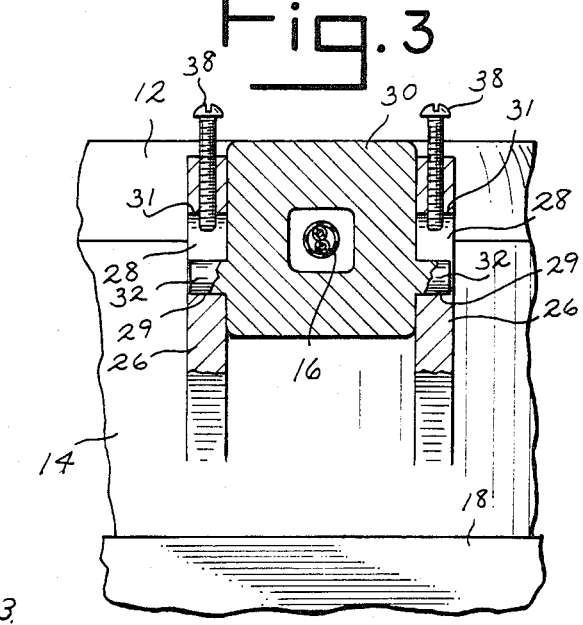
FIG. 3 is a sectional view taken along line 3—3 of FIG. 2.

Lower grill unit 14 includes a pair of rearwardly extending ears 26 each having a vertical slot 28 formed in it. Upper grill unit 12 includes a rearwardly extending arm 30 which extends between ears 26 of the lower grill unit. A pin 32 protrudes outwardly from each side of upper grill unit arm 30 and into slot 28 in the adjacent ear 26 as best shown in FIG. 3. In this manner, the cooperation between pins 32 and ears 26 define a hinge by which the upper grill unit 12 can be pivoted between its closed position as shown in FIG. 1 and an open position, such as illustrated in FIG. 4. Such hinged pivotal movement of the upper grill unit 12 is accomplished with pins 32 being rotatably supported at the lower edges 29 of ear slots 28. A transverse access slot 34 is formed in each ear 26 in communication with slot 28 so as to allow upper grill unit 12 to be removed and separated from lower grill unit 14, such as for repair and cleaning.

Pins 32 are shiftable vertically within ear slots 28 so as to allow upper grill unit 12 to shift upwardly in a generally horizontal plane relative to the lower grill unit 14 and, thereby, accommodate the expansion of batter 36 between the grill units during the cooking cycle. The amount of allowed movement of the upper grill unit 12 relative to lower grill unit 14 during the cooking cycle is regulated by a pair of adjusting screws 38 threaded downwardly through ears 26 into slots 28. By adjusting the amount of protrusion of each adjusting screw 38 into its intersecting ear slot 28, a stop is provided which limits the upward movement of the upper grill unit toward the upper slot edges 31 relative to lower grill unit 14 in its generally horizonital plane. In this manner, the permitted thickness of the cooking batter between the upper and lower grill units can be regulated as is illustrated in FIG. 5. Adjustment screws 38 do not effect the pivoting movement of the upper grill unit 12 between its closed and open positions shown in FIGS. 1 and 4.

The above described invention is not to be limited to the ddetails given but may be modified within the scope of the appended claims.

What I claim is:

1. A confectionery grill having an upper heated grill unit and a base supporting a lower heated grill unit, hinge means pivotally connecting said upper and lower grill units together for allowing pivotal movement of the upper grill unit between a closed position overlying said lower grill unit and an open position displaced from the lower grill unit, said upper grill unit including grip means for shifting the upper grill unit between its open and closed positions, the improvement wherein said hinge means includes oppositely extending pins carried by said upper grill unit, said lower grill unit including opposed support parts each having a vertical slot therein defined by upper and lower support edges, said pins fitting into the slots of the support parts and being shiftable between said upper and lower support edges of such slots upon movement of said upper grill unit toward and away from said lower grill unit when the upper grill unit is in its closed position, an adjustable protrusion part extending from each support part into said slot thereof at the upper support edge of the slot to restrict movement of the pin fitted into such slot toward its said upper support edge.

2. The grill of claim 1 wherein said support parts are rearwardly protruding spaced apart ears having said slots therein, said upper grill unit including a rearwardly protruding arm fitted between said ears, said pins carried by said arm and extending into said slots, said adjustable protrusion part being a threaded member turned into each ear and overlying the pin fitted into said slot in the ear.

* * * * *